United States Patent
Park et al.

(10) Patent No.: US 12,402,019 B2
(45) Date of Patent: Aug. 26, 2025

(54) METHOD, ELECTRONIC DEVICE AND NON-TRANSITORY COMPUTER-READABLE STORAGE MEDIUM FOR DETERMINING INDOOR RADIO TRANSMITTER DISTRIBUTION

(71) Applicant: Telefonaktiebolaget LM Ericsson (publ), Stockholm (SE)

(72) Inventors: Taesuh Park, Santa Clara, CA (US); Chun-Hao Liu, Santa Clara, CA (US); Hun Chang, Santa Clara, CA (US); Joji Philip, Milpitas, CA (US); Thalanayar Muthukumar, Plano, TX (US); Michael Maragoudakis, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 17/797,556

(22) PCT Filed: May 11, 2020

(86) PCT No.: PCT/IB2020/054452
§ 371 (c)(1),
(2) Date: Aug. 4, 2022

(87) PCT Pub. No.: WO2021/176262
PCT Pub. Date: Sep. 10, 2021

(65) Prior Publication Data
US 2023/0059954 A1    Feb. 23, 2023

Related U.S. Application Data

(60) Provisional application No. 62/985,807, filed on Mar. 5, 2020.

(51) Int. Cl.
*H04W 16/22* (2009.01)
*H04W 24/10* (2009.01)

(52) U.S. Cl.
CPC ......... *H04W 16/225* (2013.01); *H04W 24/10* (2013.01)

(58) Field of Classification Search
CPC ... H04W 16/225; H04W 24/10; H04W 24/02; H04W 16/20
See application file for complete search history.

(56) References Cited

U.S. PATENT DOCUMENTS 7,035,643 B2    4/2006 Slawitschka et al.
9,131,403 B1 *  9/2015 Courchesne ........ H04W 16/225
(Continued)

FOREIGN PATENT DOCUMENTS

| CN | 107646118 A |   | 1/2018 |           |
|----|-------------|---|--------|-----------|
| CN | 110866888 A | * | 3/2020 | G06K 9/629 |

(Continued)

OTHER PUBLICATIONS

Acedo-Hernández, et al., "Automatic Clustering Algorithms for Indoor Site Selection in LTE", EURASIP Journal on Wireless Communications and Networking, vol. 2016, Article No. 87, 2016, pp. 1-13.

(Continued)

*Primary Examiner* — Walli Z Butt
*Assistant Examiner* — Thad N Defauw
(74) *Attorney, Agent, or Firm* — NICHOLSON DE VOS WEBSTER & ELLIOTT LLP

(57) ABSTRACT

Embodiments of the disclosed techniques disclose methods for planning an indoor radio network for a building. In one embodiment, a method comprises preprocessing an image of a floor plan of the building; generating a radio propagation map for the floor plan using the preprocessed image; and (Continued)

determining an indoor radio transmitter distribution for the floor plan using the radio propagation map.

17 Claims, 19 Drawing Sheets

(56) References Cited

U.S. PATENT DOCUMENTS

| | | | |
|---|---|---|---|
| 10,606,963 | B2 | 3/2020 | Tiwari et al. |
| 2007/0047492 | A1 | 3/2007 | Kim et al. |
| 2009/0061939 | A1 | 3/2009 | Andersson et al. |
| 2011/0306363 | A1 | 12/2011 | Wang et al. |
| 2013/0194276 | A1 | 8/2013 | Sato et al. |
| 2015/0094014 | A1 | 4/2015 | Diamond et al. |
| 2015/0356099 | A1 | 12/2015 | Targonski et al. |
| 2016/0066179 | A1 | 3/2016 | Huang et al. |
| 2017/0272131 | A1 | 9/2017 | Ananth et al. |
| 2017/0338901 | A1 | 11/2017 | Zhihua et al. |
| 2018/0120410 | A1 * | 5/2018 | Ivanov ............... G01S 5/02524 |
| 2019/0304104 | A1 * | 10/2019 | Amer ..................... G06T 13/80 |

FOREIGN PATENT DOCUMENTS

| | | |
|---|---|---|
| EP | 3213432 A1 | 9/2017 |
| EP | 3291590 A1 | 3/2018 |
| JP | H11-191752 A | 7/1999 |
| JP | 2010-187140 A | 8/2010 |
| JP | 2014-072633 A | 4/2014 |
| WO | 98/31112 A2 | 7/1998 |
| WO | 00/79735 A1 | 12/2000 |
| WO | 01/58194 A1 | 8/2001 |
| WO | 2016/067017 A1 | 5/2016 |
| WO | WO-2017039521 A1 * | 3/2017 |
| WO | 2018/107906 A1 | 6/2018 |
| WO | 2019/063079 A1 | 4/2019 |
| WO | WO-2019120487 A1 * | 6/2019 ............... G06N 3/02 |
| WO | 2019/220243 A1 | 11/2019 |
| WO | 2019/220244 A1 | 11/2019 |
| WO | 2021/161273 A1 | 8/2021 |
| WO | 2021/176262 A1 | 9/2021 |
| WO | 2023/170457 A1 | 9/2023 |

OTHER PUBLICATIONS

Isola, et al., "Image-to-Image Translation with Conditional Adversarial Networks", 2017 IEEE Conference on Computer Vision and Pattern Recognition (CVPR), 2017, pp. 11125-1134.

Liu, et al., "DA-cGAN: A Framework for Indoor Radio Design Using a Dimension-Aware Conditional Generative Adversarial Network", 2020 IEEE/CVF Conference on Computer Vision and Pattern Recognition Workshops (CVPRW), 2020, pp. 2089-2098.

PCT Patent Application titled "Estimating Obstacle Materials From Floor Plans", Application No. PCT/IB2022/054451, filed on May 13, 2022 by Telefonaktiebolaget LM Ericsson, 29 pages.

Ronneberger, et al., "U-Net: Convolutional Networks for Biomedical Image Segmentation", MICCAI 2015, Part III, LNCS 9351, 2015, pp. 234-241.

U.S. Provisional Patent Application titled "Estimating Obstacle Materials From Floor Plans", U.S. Appl. No. 63/319,246, filed Mar. 11, 2022 by Park et al., 28 pages.

U.S. Provisional Patent Application titled "Method and System for Estimating Indoor Radio Transmitter Count", U.S. Appl. No. 62/976,221, filed Feb. 13, 2020 by Park et al., 56 pages.

Murali et al., "Indoor Scan2BIM: Building Information Models of House Interiors", 2017 IEEE/RSJ International Conference on Intelligent Robots and Systems (IROS), Available Online at <https://www.microsoft.com/en-us/research/uploads/prod/2019/09/MSrivathsan2017IROS.pdf>, Sep. 2017, 8 pages.

* cited by examiner

7 Locations for Radio Transmitter Placement 132

METHOD, ELECTRONIC DEVICE AND NON-TRANSITORY COMPUTER-READABLE STORAGE MEDIUM FOR DETERMINING INDOOR RADIO TRANSMITTER DISTRIBUTION

CROSS-REFERENCE TO RELATED APPLICATIONS

This application is a National stage of International Application No. PCT/IB2020/054452, filed May 11, 2020, which claims the benefit of U.S. Provisional Application No. 62/985,807, filed on Mar. 5, 2020, which are hereby incorporated by reference.

TECHNICAL FIELD

Embodiments of the invention relate to the field of communication network design; and more specifically, to determining an indoor radio transmitter distribution.

BACKGROUND ART

Telecommunication companies are expanding the coverage of their cellular networks to indoor environments. Yet a cellular network design for indoor users can be more challenging than outdoor because many indoor obstacles may block or distort radio signal propagations and indoor radio transmitters used in an indoor cellular network are typically required to operate at far lesser output power than that of outdoor macro or small cell radio transmitters. While outdoor cellular network designs usually require one radio base station to cover an area of hundreds of meters in radius, indoor designs may require multiple radio transmitters operating at far lower output power to cover all areas in a building or a specific floor within the building.

Employing a concept called ray tracing, industry standard indoor design tools often use sophisticated and resource/time intensive simulations to determine radio transmitter placement indoors and estimate indoor radio propagation. To determine the optimal placement of radio transmitters within the building or a specific floor, the indoor design simulation or process needs to consider the frequency at which the radio transmitter is operating, floor layout, floor density, material of walls, columns, and fixtures. For example, fewer radio transmitters are required to cover a whole floor when there are no walls or if the density of objects on the floor is sparse, while the presence of many walls or partitions or a floor with a high concentration of objects may require a higher number of radio transmitters to cover all required areas on a floor. The design of an indoor cellular network involves manually marking all the wall types and prohibited areas on a floor prior to running simulations, and this process can take days or longer.

SUMMARY

Embodiments of the disclosed techniques disclose methods for planning an indoor radio network for a building. In one embodiment, a method comprises preprocessing an image of a floor plan of the building; generating a radio propagation map for the floor plan using the preprocessed image; and determining an indoor radio transmitter distribution for the floor plan using the radio propagation map.

Embodiments of the disclosed techniques disclose electronic devices for planning an indoor radio network for a building. In one embodiment, an electronic device comprises a processor and non-transitory machine-readable storage medium storing instructions, which when executed by the processor, are capable of causing the electronic device to perform the following: preprocessing an image of a floor plan of the building; generating a radio propagation map for the floor plan using the preprocessed image; and determining an indoor radio transmitter distribution for the floor plan using the radio propagation map.

Embodiments of the disclosed techniques disclose non-transitory computer-readable storage media for planning an indoor radio network for a building. In one embodiment, a non-transitory computer-readable storage medium provides instructions that, when executed by a processor of an electronic device, cause the electronic device to perform the following: preprocessing an image of a floor plan of the building; generating a radio propagation map for the floor plan using the preprocessed image; and determining an indoor radio transmitter distribution for the floor plan using the radio propagation map.

Embodiments of the disclosed techniques reduce lead time to determine an indoor radio transmitter distribution (e.g., the number of indoor radio transmitters, their placements and associated bill of materials (BOMs) for a given venue or building), thus they enable a network designer to produce BOMs and preliminary quotes to customers significantly faster. The embodiments also enable the network designer to significantly scale up the design and deployment of indoor radio transmitters when designing an indoor cellular network.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
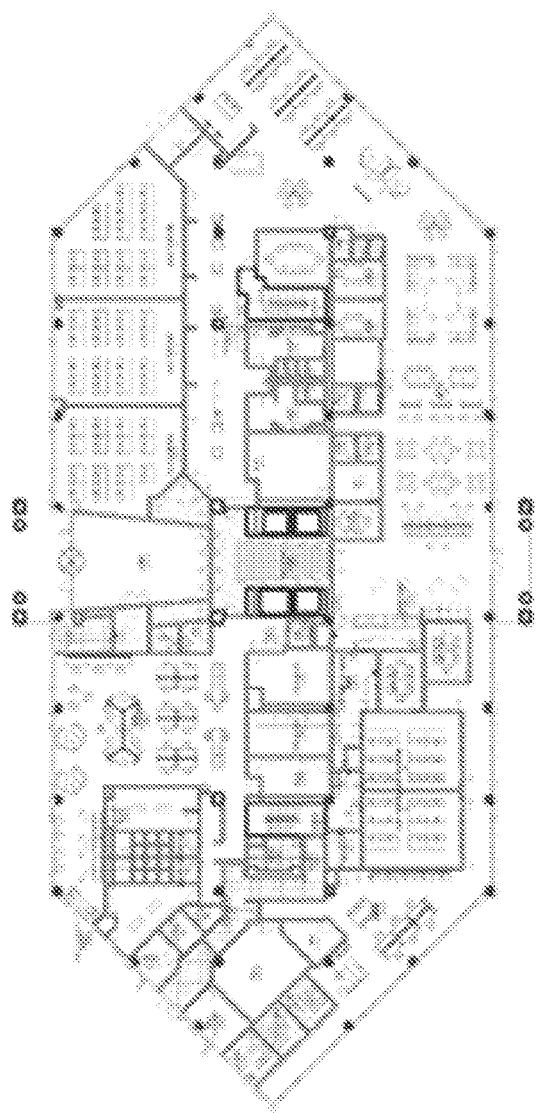
FIG. 1A shows an exemplary raw floor plan per one embodiment.

The following description describes methods and systems for determining an indoor radio transmitter distribution. The indoor radio transmitters are also referred to as indoor radio units (IRUs). In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Indoor Radio Transmitter Distribution Using Simulation

Currently when building an indoor cellular network (also referred to as an indoor radio network), indoor radio design engineers use complex simulation tools to predict the radio propagation pattern from new radio transmitter installations in a given floor plan. As the simulation typically uses a complex ray tracing algorithm, the current process of finding the optimal number and placement of radio dots (the locations to place indoor radio transmitters) in a building could take a long time (e.g., several days). The duration depends on the complexity of the floor plans, the layout of the venue or building structure, the number of frequency bands required to be deployed, and other factors.

One may use existing industry standard indoor design tools that process a project with one venue or building, each floor at a time. That involves a cumbersome process of determining wall types, building material, and macro cell coverage indoors. It also comes with the added cost of third-party indoor radio design software procurement and multiple engineering resources operating the software. This long lead time impacts multiple stages of the indoor radio solution sales process. For example, the process results in very coarse estimation of the number of radio transmitters required in the preliminary design; and the quoting process results in quotes with large deviation from the final quote. Additionally, the process extends the time taken to provide a final design, bill of materials (BoM), and final quote to the customer, and that results in project delays. Furthermore, the process does not scale well and is not conducive to perform indoor design on a large number of buildings at once.

Machine-Learning Based Solutions

To overcome the limitations of the simulation-based approach, some embodiments use machine-learning (e.g., a supervised or unsupervised neural network) based methods to predict the desirable number, placement, and radio propagation of radio transmitters for a given floor plan.

For example, some embodiments partition a given floor plan into optimal sections and then employ a layered pipeline (also referred to as a network), to generate synthetic images of radio propagation for a given frequency (or frequency band) and radio transmitter placement using a generative network (also referred to as a generator) for each section, while ensuring accuracy of the generated image through a self-correcting feedback loop (e.g., using a so-called discriminator network or simply discriminator). The generative network and discriminator network may be used in a generative adversarial network (GAN) implementation to arrive at a desirable indoor radio transmitter distribution.

In some embodiments, a discriminator network could be trained with radio propagation data collected from previously implemented indoor radio propagation designs as well as from radio measurements collected from current indoor field deployments. The training may use machine-learning (e.g., using neural networks such as a GAN). The discriminator network then uses the data presented to it to learn statistically significant phenomena related to placement of radio transmitters operating at a given frequency and the placement's relationship to factors such as radio propagation, operating power, floor shape, wall layout, wall material, furniture density, orientation, and connectivity between rooms on the floor. The embodiments stitch back the radio propagation images created for each section on a floor to produce the radio propagation image and signal density blobs for a given floor plan, the signal density blobs are then used to determine the number and placement of the radio transmitters on the given floor.

Some embodiments employ user-created or machine-generated prohibition and interference zones to avoid or adjust the placement of radio transmitters at specific locations on the floor. Prohibition zones are used to completely exclude a radio transmitter to be placed in a specific area or section of the floor while interference zones are used to adjust the placement of radio transmitters based on radio interference measured from radio transmitters that are outside the indoor location or venue or building. Interference zones can be machine generated images using actual measurements from external radio transmitters ("external" in the sense that these radio transmitters are not a part of the indoor cellular network to be installed) on a given floor or could be synthetically generated images based on user designation of radio propagation from external radio transmitters.

Some embodiments reduce lead time to produce preliminary estimates of the number of indoor radio transmitters, their placements, and associated bill of materials (BoMs) for a given venue or building from several weeks down to several minutes irrespective of the complexity of the venue or building and thereby enabling a network designer to produce BoMs and preliminary quotes to customers significantly faster. The embodiments will also transform current indoor radio design, survey, and deployment processes and will also enable the network designer to significantly scale up the design and deployment of indoor radio transmitters for its customers.

Operations for Determining Indoor Radio Transmitter Distribution

In an exemplary implementation, the system trains a conditional Generative Adversarial Network (cGAN) to predict the desirable radio transmitter placement using a large number of data sets, each including (1) a floor plan and (2) its corresponding radio propagation map (which is presumably optimal as determined by radio design engineers). For example, a pixel-to-pixel network may be trained using pairs of floor plans and their radio propagation maps based on either optimal radio transmitter placement by human designers using industry standard indoor radio planning tools or from radio measurements collected from already deployed radio transmitters for various floor plans.

The floor plan as an input may be provided as a color image, which is desirable in some embodiments, although a monochrome or gray version of it also works. In some embodiments, the floor plan may be extracted from one format and stored in another (e.g., a PDF file is converted in PNG format). FIG. 1A shows an exemplary raw floor plan per one embodiment.

For the given floor plan, one or more polygons may be drawn to determine the one or more regions of interest (ROIs) of the floor plan because many floor plans come with unnecessary padding and auxiliary texts. By setting the ROIs, the final radio transmitter distribution design can be refined.

Figure 1B:
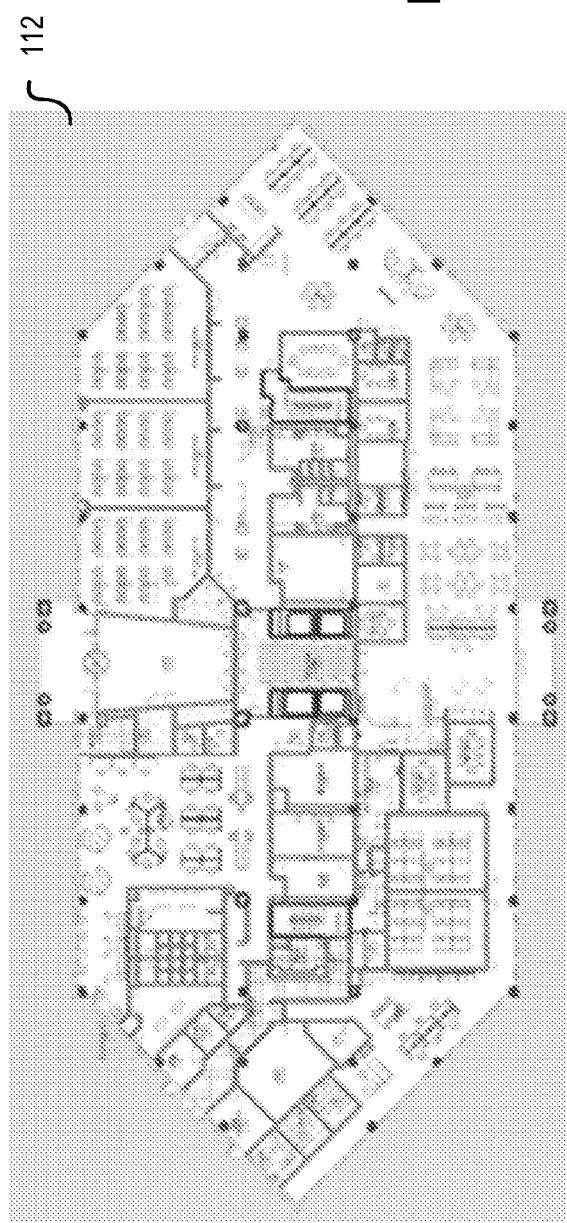
FIG. 1B shows an exemplary padded raw floor plan per one embodiment.

The size of the ROIs helps the determination of the number of sections into which the floor plan is split. Such split helps limit the size and resolution of the floor plan to be used for training the machine learning model as the model could be limited by the dimension of its input due to computing hardware limitations. In some embodiments, the maximum input size and resolution of the input can be limited to 512×512 pixels. If one rescales a big floor plan down to a single section of 512×512 regardless of its original dimension, most internal walls in the floor plan will be lost and thereby degrade the quality of the predicted radio propagation map. Therefore, the optimal size and dimension of each section is determined by the machine learning model and training data set in some embodiments. For example, 2,000 square feet may be set as the size of each section empirically. FIG. 1B shows an exemplary padded raw floor plan per one embodiment. The padded raw floor plan includes the regions that are masked out (the outer region indicated by reference 112). The padded raw floor plan is fed into a conditional Generative Adversarial Network (cGAN). The cGAN then provides a radio propagation map indicating a radio transmitter distribution.

Figure 1C:
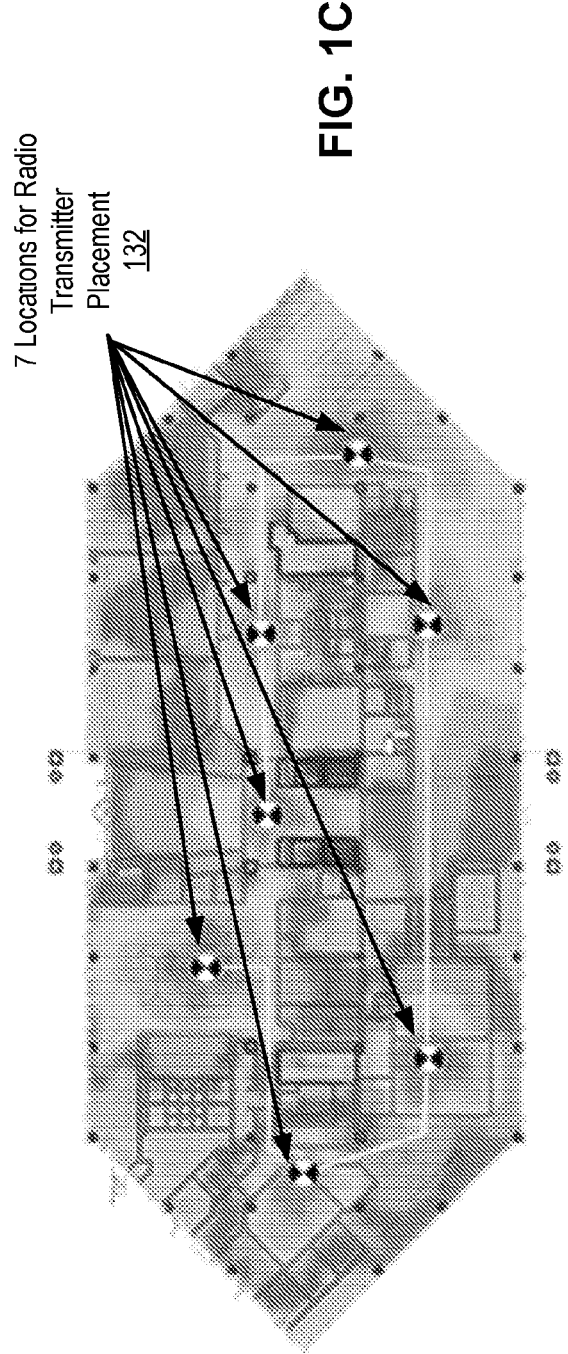
FIG. 1C shows an exemplary heatmap indicating radio transmitter distribution per one embodiment.

The cGAN produced radio propagation map may be a colored heatmap. FIG. 1C shows an exemplary heatmap indicating radio transmitter distribution per one embodiment. The radio transmitter distribution is the output of a cGAN, and it indicates the placement of 7 radio dots as shown at reference 132, each being a location to install an indoor radio transmitter. The heatmap may be a colored or grayscale one, and the color/grayscale level represents the received radio signal power at different locations. The deeper in red (or darker in grayscale level) represents stronger received signal power.

Figure 1D:
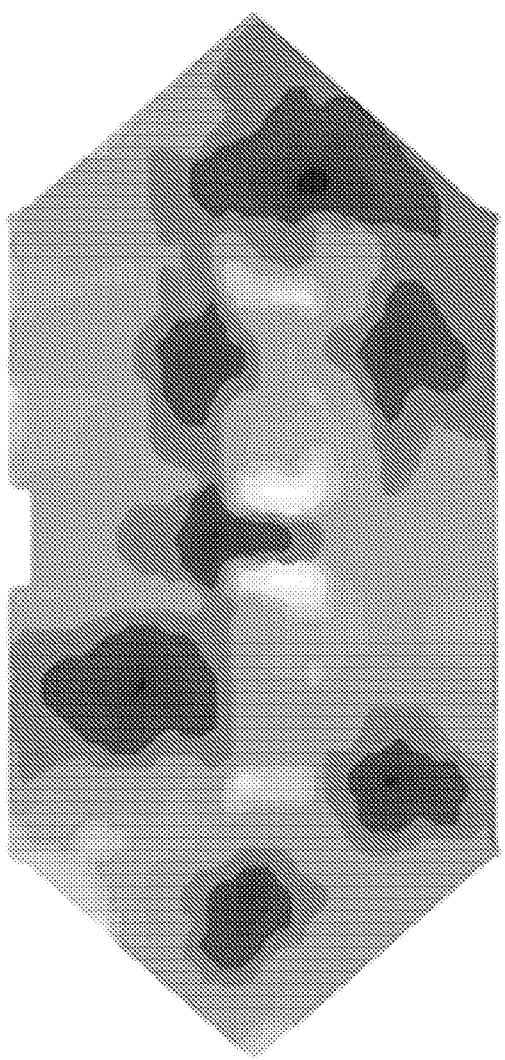
FIG. 1D shows an exemplary grayscale heatmap per one embodiment.

The heatmap in FIG. 1C, when it's colored, may be converted to a grayscale one. FIG. 1D shows an exemplary grayscale heatmap per one embodiment. In the grayscale heatmap, the darker areas are the ones with stronger received signal power. The colored and/or grayscale heatmap, along with its floor plan, may then be used to train the cGAN as a historical data set.

The Machine-Learning Model

Figure 2A:
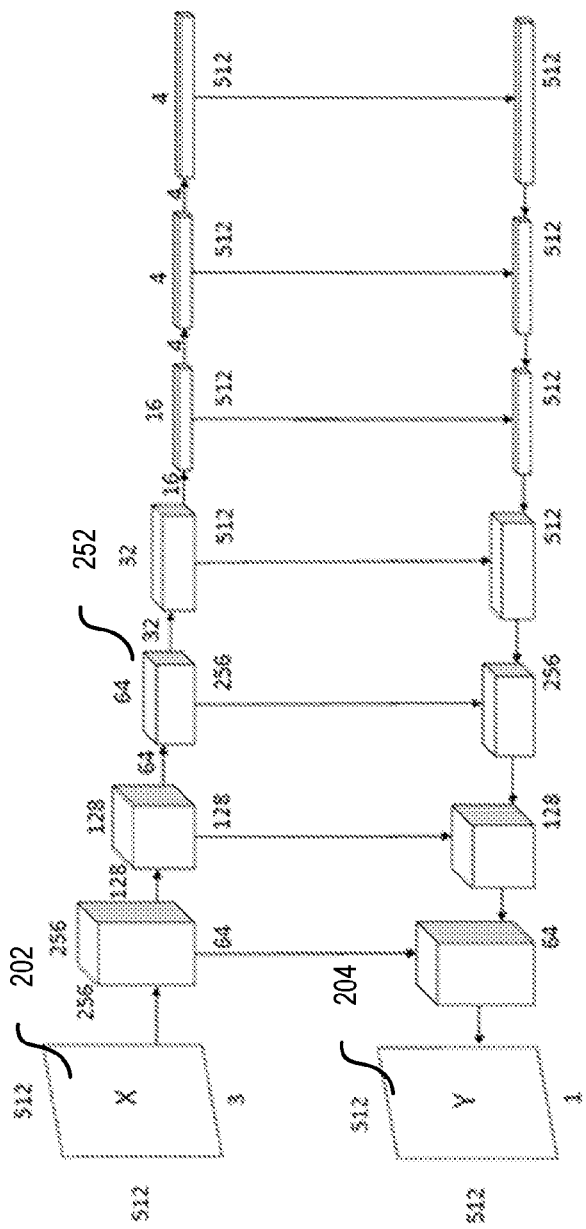
FIGS. 2A-B show an exemplary machine learning model for producing a heatmap per one embodiment.
Figure 2B:
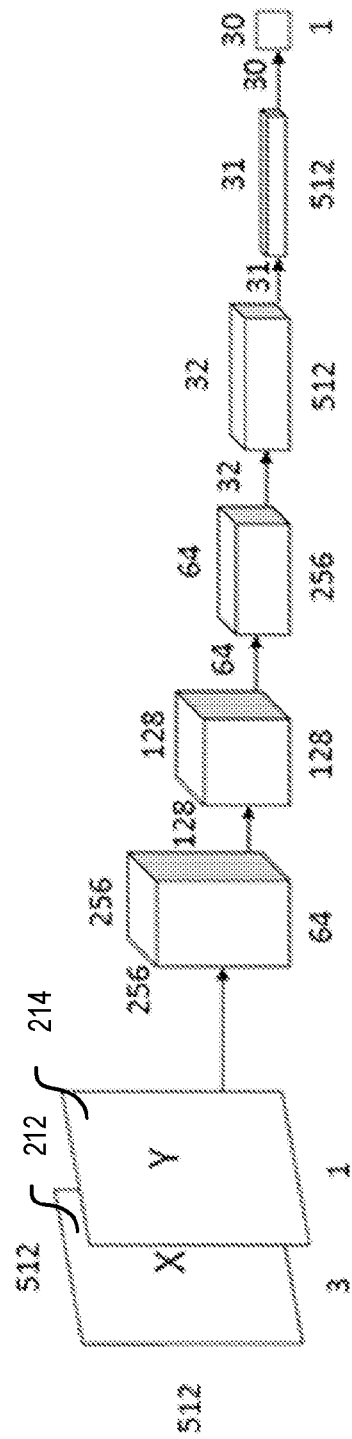

A machine-learning model is used to translate a floor plan to a radio propagation map (e.g., a heatmap), and FIGS. 2A-B show an exemplary machine learning model for producing a heatmap per one embodiment. The machine-learning model may be a conditional Generative Adversarial Network (cGAN) discussed herein above. FIG. 2A shows a generator of the neural network and FIG. 2B shows a discriminator of the neural network. Image X (at references 202 and 212) is the input image, which includes a floor plan, and image Y (at references 204 and 214) is the corresponding heatmap used in training the machine-learning model. The numbers accompanying the blocks represent the image/filter dimension and the number of channels of the blocks. For example, at node 252, the numbers 64 and 64 form the dimension of the node (width and height respectively), and the number of channels is 256. Each block in FIG. 2A and FIG. 2B has the same definition, i.e., width×height×channels.

An objective of the machine-learning model is to translate a floor plan image to a heatmap image, and it is closely related to the colorization problem. The colorization of a given sketch of floor plan not only needs to preserve its border shape, but also needs to learn from its internal structure to generate the correct signal heatmap. The structure of a floor plan highly correlates with its heatmap, e.g., a concrete wall has much higher signal attenuation than a dry wall. Therefore, one may expect the signal strength to decay quickly around a concrete wall. To solve the image translation problem, a traditional GAN may not be sufficient to learn the mapping since it generates images from a random noise. Yet a cGAN learns the mapping from an input image and random noise to the corresponding output image. Thus, one embodiment adopts cGAN but drops the random noise as the neural network architecture, since the focus is on generating one heatmap with optimal radio dot placement.

In order to preserve most of the floor plan structure, one embodiment adopts the U-Net architecture as the generator. Each convolutional layer extracts features from the previous layer and passes it to the next layer. The shallow layers are responsible for extracting low-level features from a given image such as different type of lines. The middle layers are responsible for extracting mid-level features such as shape and texture. The deep layers are responsible for extracting high-level features such as object, composition of different shapes, or even more complicated signals. In FIG. 2A, the layers go from shallow to deep from left to right.

U-Net is a special encoder-decoder network such that it concatenates each layer in the encoder to the symmetric layer in the decoder. The encoder tries to compress different levels of information as tight as possible, and the decoder tries to decode and transform them to another image with the help of cascading with the corresponding encoder layer. This bypass scheme will minimize the sketch structure loss through the entire feature extraction and reconstruction process. For the discriminator, one embodiment selects an encoder only network in the architecture. The encoder here serves the same purpose of extracting low-level to high-level features. But unlike the generator, the goal for the discriminator is to classify between a real heatmap and a fake heatmap from the generator. Therefore, the deep layer features are sufficient to achieve this task. In one embodiment, the PatchGAN architecture is used to output a matrix of probabilities for the final layer in the discriminator to show whether each section of the image can be classified as the real image or not.

The Identification of Radio Transmitter Centers

Through a neural network such as a cGAN, a radio propagation map (which may be represented by a heatmap), indicating the signal propagation distribution for each section may be produced, and a clustering algorithm may be applied to count blobs and get their respective centers. Each blob is a region within the radio propagation map (e.g., an image) that includes signal points that are strong enough (e.g., the computed signal power is over a power threshold) and close to each other (e.g., within a physical distance threshold), and the signal points within the region but having weaker signals (e.g., the computed signal power is below a power threshold) are excluded. The respective centers of the blobs are the location at which radio transmitters should be placed.

The clustering algorithm to determine the radio transmitter centers should be able to count the number of clusters automatically. Moreover, it should be related to the density of points in the spatial domain and be noise-tolerant, due to the noisy prediction nature from cGAN. Thus, some embodiments adopt density-based spatial clustering of applications with noise (DBSCAN) algorithm as the clustering method. DBSCAN satisfies the above properties, and two-dimensional spatial data (pixel locations) is advantageous for using Euclidean distance to compute distance between points.

The DBSCAN algorithm is a density-based clustering non-parametric algorithm: given a set of points in some space, it groups together points that are closely packed together (points with many nearby neighbors), marking as outliers points that lie alone in low-density regions (whose nearest neighbors are too far away). The applied DBSCAN algorithm can be an extension/variation of the DBSCAN such as generalized DBSCAN (GBDSCAN) (generalized to arbitrary neighborhood and dense predicates) or Hierarchical Density-Based Spatial Clustering of Applications with Noise (HDBSCAN).

Figure 3:
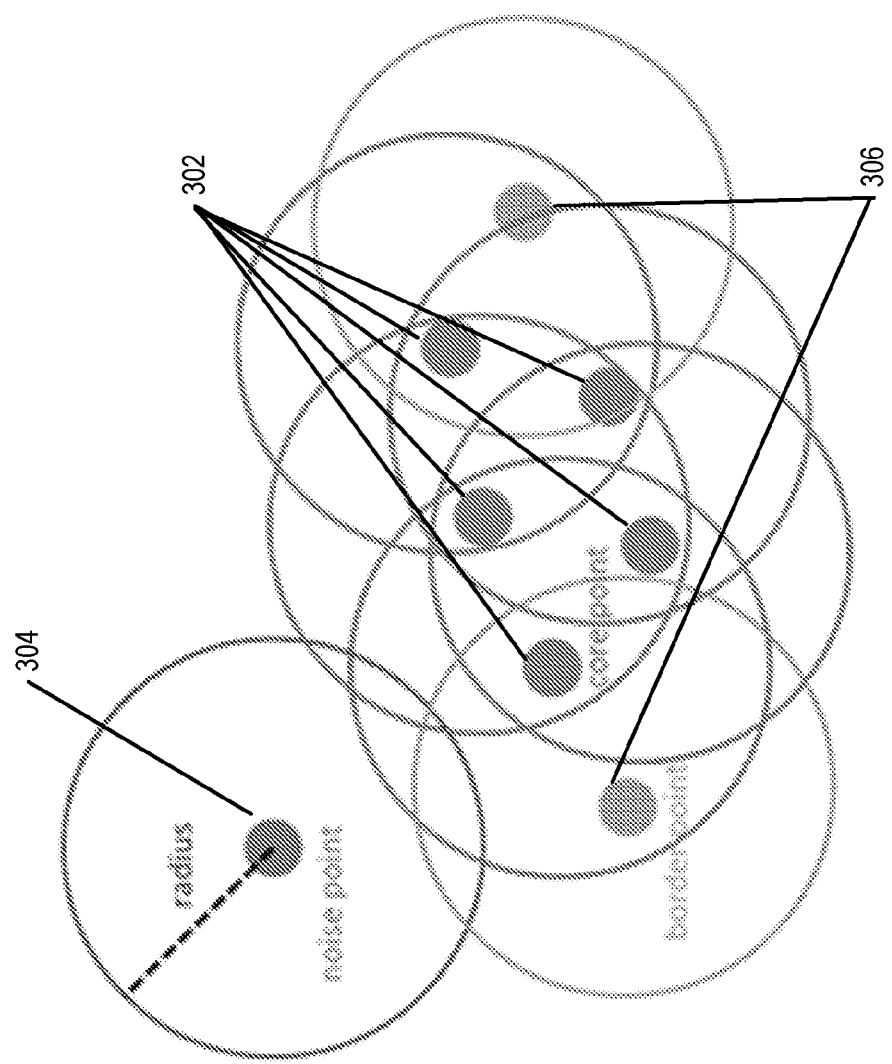
FIG. 3 shows an exemplary density-based spatial clustering of applications with noise (DBSCAN) algorithm per one embodiment.

FIG. 3 shows an exemplary density-based spatial clustering of applications with noise (DBSCAN) algorithm per one embodiment. Two parameters are defined, a radius size and the number of minimum samples within the radius of a cluster core point. The algorithm starts at a random point, and it will count how many other points are within its radius. If the number of points is greater than or equal to the predefined number of minimum samples, it is tagged as a core point (e.g., points 302). The algorithm will continue this process until no other data points are nearby, and then it will look to form a second cluster.

The point 304 in FIG. 3 is a noisy point that is not included in any cluster. The points 306 are border points such that they do not have minimum samples within their radius, but they are still being considered as part of a cluster.

One drawback for applying a DBSCAN algorithm is that at least two hyperparameters need to be chosen, including the distance threshold (i.e., the radius) and the minimum samples within a radius to define a core point. To search for the best hyperparameters automatically, a HDBSCAN may perform DBSCAN over various radii and integrate it with the best stability. HDBSCAN requires little or no hyperparameters tuning, and the only hyperparameter that needs to be chosen is minimum cluster size, which is easier to select. Through a DBSCAN algorithm (DBSCAN or a variation thereof), the radio transmitter centers (the radio dots) may be selected.

Image Data Augmentation

The machine-learning model discussed herein requires training through image data sets, and some embodiments use genuine loss functions with aggressive image augmentation to produce a large number of image data sets.

One embodiment uses a gradient similarity (GSIM) or a multi-scale GSIM (MS-GSIM) loss function. A ground truth heatmap image, which may be generated from a human designed radio transmitter distribution map, exhibits a unique characteristic, the gradient pattern. The uniqueness of this feature is that it propagates the signal strength from the center of a radio dot, to its surrounding pixels smoothly. To compare the gradient pattern between two images, some embodiments use a new metric, the gradient similarity (GSIM) index, and then extend it to its multiscale version. The GSIM index can be derived in three steps, considering a pixel location (i,j) for image Y and G(X) (see FIGS. 2A-B and related discussion above), where G(X) is the output of a generator of a machine-learning model: (1) a two dimensional Sobel filter may be applied to obtain the gradient on (i,j), and they are represented as $d_y(i,j)$ and $d_g(i,j)$, respectively; (2) then their cosine similarity (CS), denoted as CS $(d_y(i,j), d_g(i,j))$ may be calculated; and (3) the GSIM index is then obtained through averaging out the cosine similarity on all pixels in Y and G(X). Note that the GSIM index may be obtained through another arithmetic determination (e.g., median, mode, maximum, or minimum from the cosine similarity on all the pixels) in alternative embodiments.

The GSIM index may be sensitive to image scale. On some large-scale images, although a good gradient pattern from a predicted image G(X) can visually be seen, GSIM provides a low score. To address this scaling issue, some embodiments use a multi-scale version of GSIM, MS-GSIM index. In these embodiments, GSIM is applied on different image scales, and then the resulting scores are merged by a meaningful average function.

Figure 4:
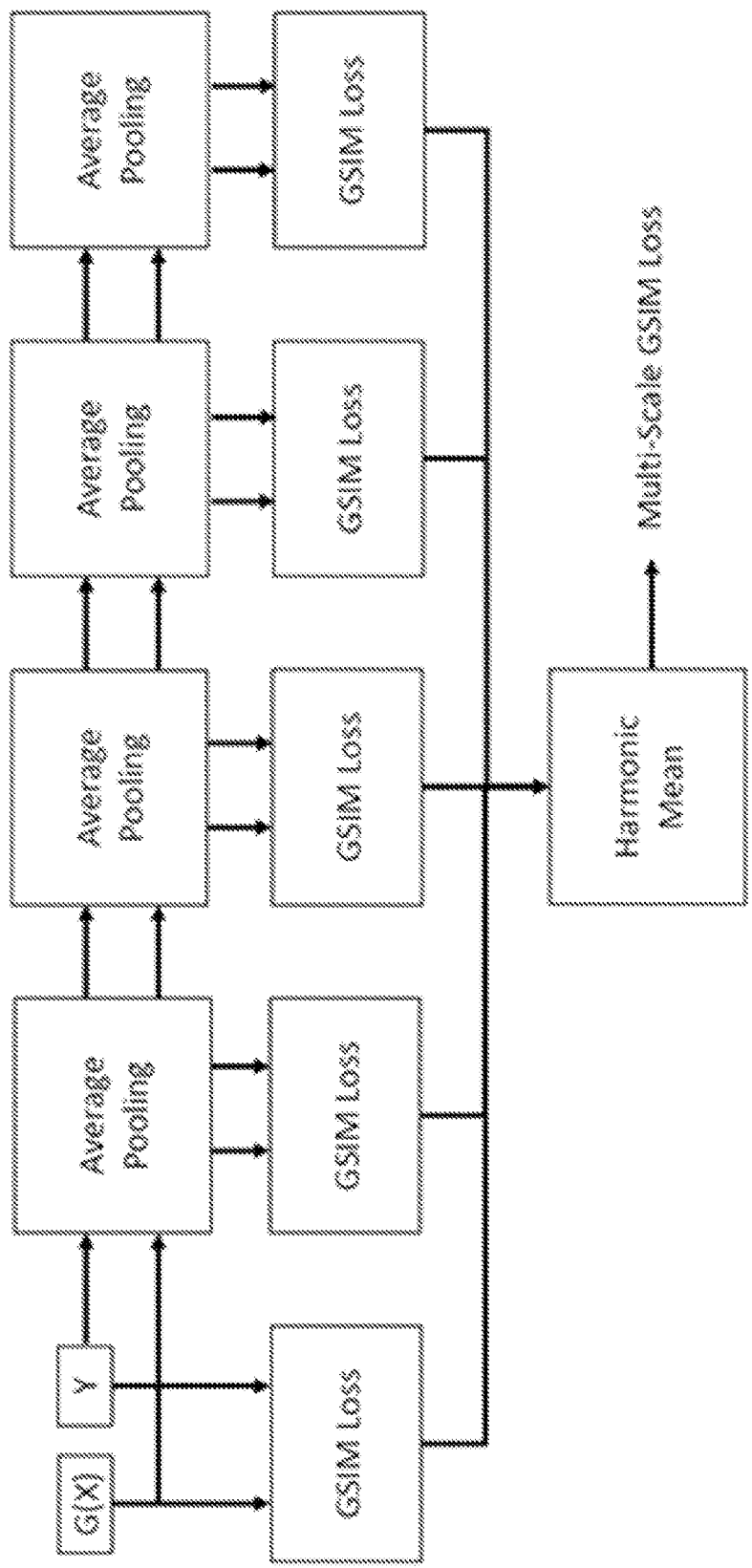
FIG. 4 shows the operations of obtaining multi-scale gradient similarity (MS-GSIM) loss per some embodiments.

FIG. 4 shows the operations of obtaining multi-scale gradient similarity (MS-GSIM) loss per some embodiments. First, an average pooling function avg_pool(Y,k,s,p) is defined for scaling purposes, given its input image Y, kernel size k, stride s, and padding method p. The output of different scales of images (various image resolutions such as 512 by 512, 256 by 256, 128 by 128 . . . , etc.) can be represented recursively as $a_{i+1}$=avg_pool($a_i$,k,s,p) and $b_{i+1}$=avg_pool($b_i$,k,s,p) with $a_1$=Y and $b_1$=G(X), for i in {1, 2, . . . , N}, where N is number of scale. Then an average function $f$ is defined to combine the GSIM scores from all scales. The proposed MS-GSIM index can be calculated with $f(GSIM(a_1,b_1), \ldots, GSIM(a_N,b_N))$. The most intuitive function for $f$ is the arithmetic mean. But after some experiments, it was found that using harmonic mean provides better results as it shifts the mean toward the lower GSIM loss. In this case, there will be smaller loss value if some of the scales result in good GSIM loss. The proposed MS-GSIM loss function can be represented as the following formula:

$$L_{MS-GSIM} = f((1 - GSIM(a_1, b_1), \ldots , (1 - GSIM(a_N, b_N))), \quad (1)$$

In Formula (1), each $a_i$ is a different scale image of Y, and each $b_i$ is a different scale image of G(X), and the loss function may be implemented as $$f(x_1, x_2, \ldots, x_N) = \frac{N}{\sum_{i=1}^{N} \frac{1}{x_i}},$$

so the loss function considers the difference between different scales of Y and G(X) and takes the average of them in one embodiment. The MS-GSIM loss is used to make the generated heatmap as similar to the true heatmap as possible, by giving more penalty to difference from the view of gradient comparison rather than pixel-wise comparison in the early stage of training. Note that in an alternative embodiment, another average function $f$ may be defined to combine the GSIM score from all scales, e.g., a function to find median or mode of all the scores.

Functional Modules to Determine Indoor Radio Transmitter Distribution

Figure 5:
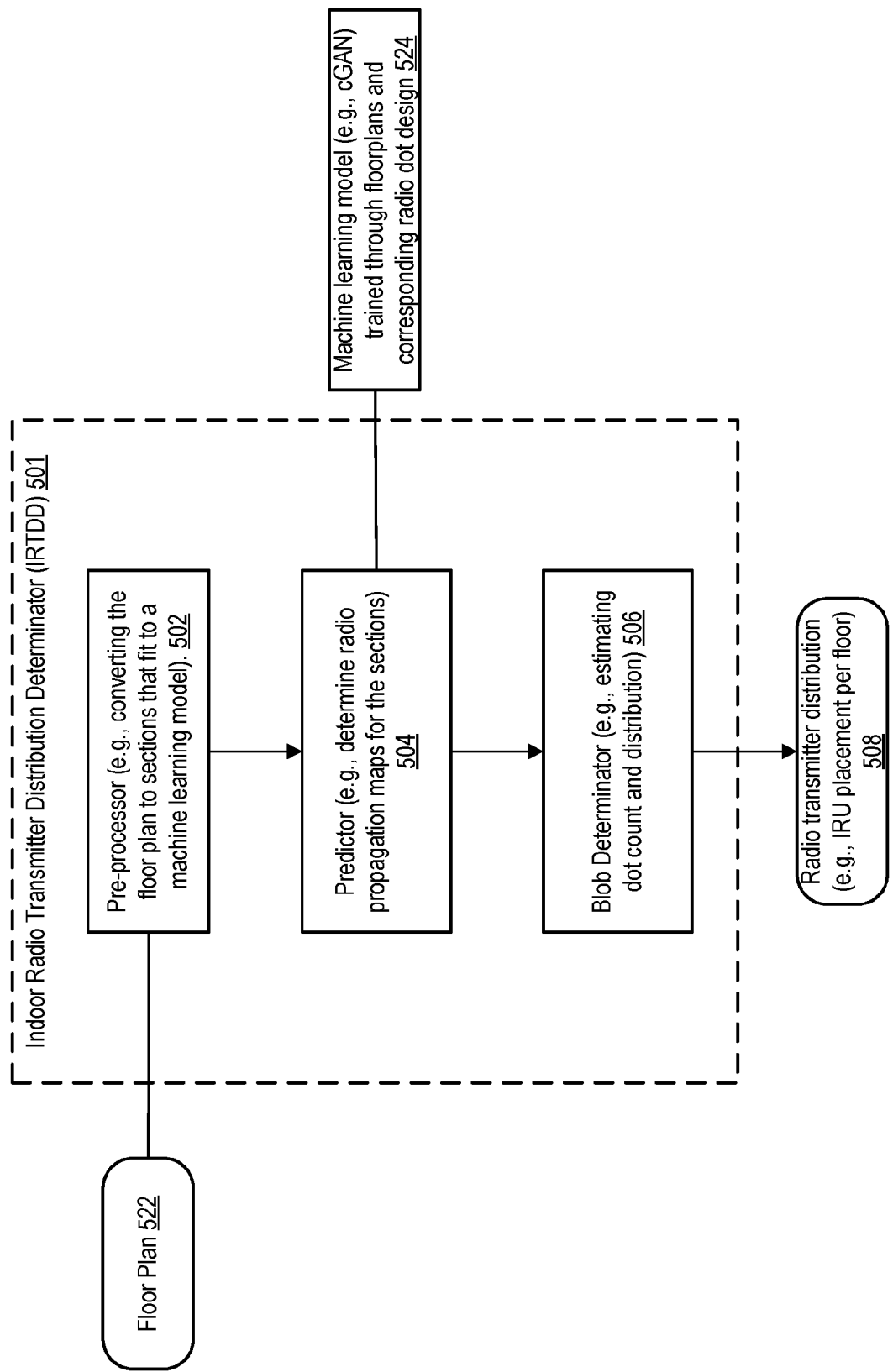
FIG. 5 is a block diagram showing various modules for estimating an indoor radio transmitter distribution per some embodiments.

FIG. 5 is a block diagram showing various modules for estimating an indoor radio transmitter distribution 856 per some embodiments. A floor plan 522 provides information about a floor layout (including radio transmission obstacles) in a format (e.g., PDF, JPG, PNG, or any equivalent digital format).

Pre-processor 502 registers region(s) of interest, prohibition mask(s), interference mask(s) and converting/partitioning the floor plan 522 accordingly to one or more sections that is fit to a machine learning model in predictor 504.

Predictor 504 predicts/determines radio propagation map(s) for given section(s) by using a machine learning model 524 (cGAN or any equivalent that is able to perform pixel-to-pixel prediction). The machine learning model has been trained using previous pairs of floor plans and their corresponding radio dot designs before being used. In some embodiments, the machine learning model 524 is integrated within the predictor 504.

Blob determinator 506 counts blobs in the radio propagation map(s) from the predictor 504 and finding the centers of blobs as the positions to install radio transmitters in the given floor plan. It can be implemented by an algorithm such as DBSCAN or HDBSCAN.

Radio transmitter distribution (508) is the final output from the blob determinator 506, which includes the information about radio transmitter placement onto the floor plan.

The pre-processor 502, predictor 504, and blob determinator 506 may be modules within an indoor radio transmitter distribution determinator (IRTDD) 501. The IRTDD 501 may be implemented in an electronic device such as 902 discussed herein below.

Figure 6:
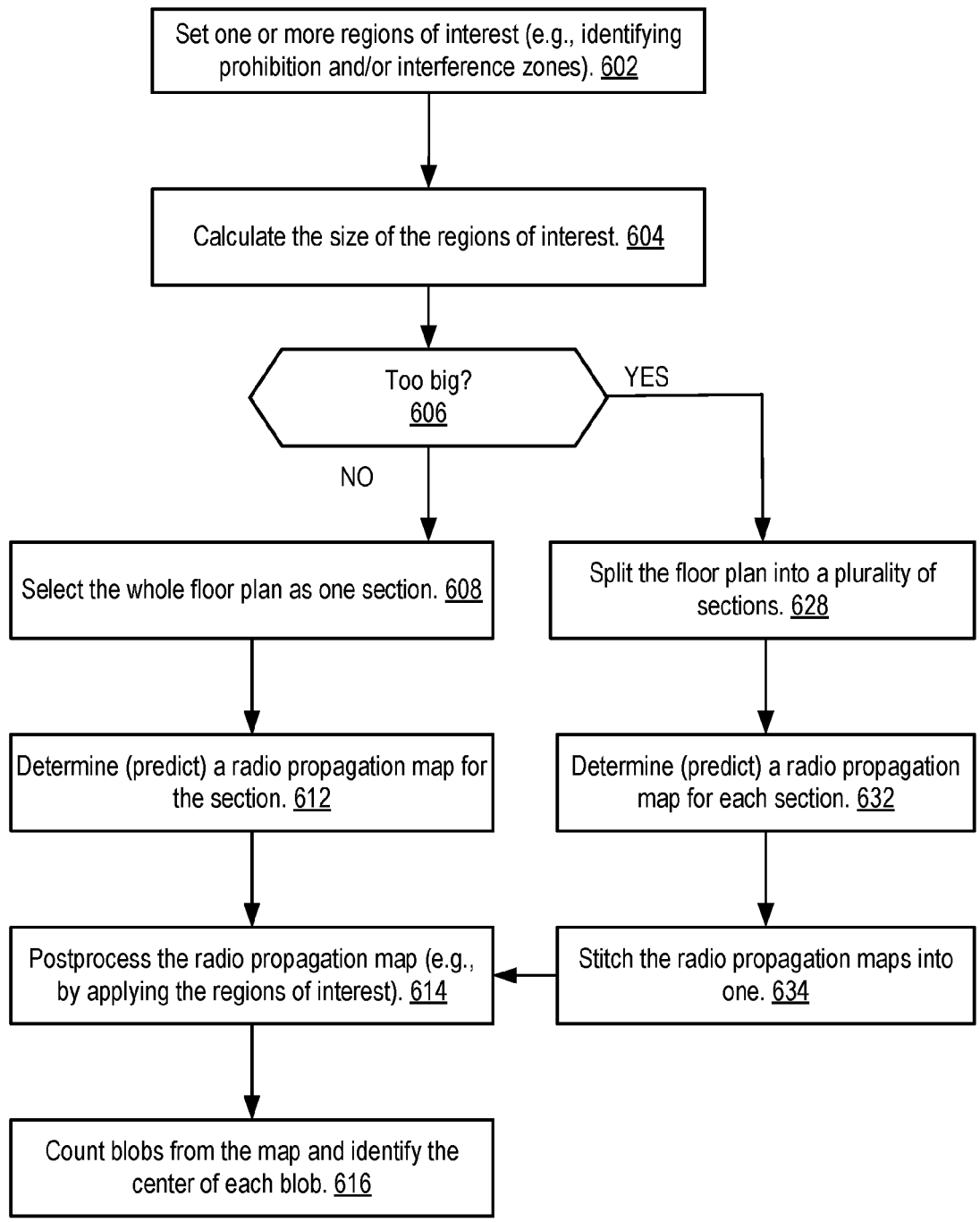
FIG. 6 is a first flow chart of determining an indoor radio transmitter distribution per some embodiments.

FIG. 6 is a first flow chart of determining an indoor radio transmitter distribution per some embodiments. The operations may be performed by an electronic device such as 902 discussed herein below. At reference 602, one or more regions of interest are set from an image of a floor plan. In some embodiments, the regions of interest are set by identifying the prohibition zones and/or the interference zones on the floor plan image. Then the size of the regions of interest is calculated at reference 604. At reference 606, it is determined whether the size of the regions of interest is too big for the electronic device. The determination may be based on the computation resources and network bandwidth of the electronic device, and/or machine-learning model and its associated training data sets. For example, if the machine-learning model is trained using data sets with a small size floor plan (and their corresponding radio propagation maps), the machine-learning model may not be suitable to process a larger size floor plan. The electronic device may have a threshold of dimension of the floor plan to be processed, and the size of regions of interest is determined to be too big when the size crosses the threshold.

When it is determined that the size is not too big, the flow goes to reference 608, and the whole floor plan is selected as one section. The regions of interest are marked on the floor plan image. At reference 612, a radio propagation map for the one section is determined. When the determination uses a machine learning model, the determination may also be referred to as a prediction. The machine learning model may use the ones such as cGAN as discussed herein above.

At reference 614, the radio propagation map is postprocessed. In some embodiments, the postprocess includes applying the regions of interest. For example, the radio propagation map may be adjusted based on the one or more interference zones that are impacted by radio transmitters outside of the indoor radio network to be implemented. Expected radio signal quality may be enhanced by placing more radio transmitters to the interference zones by suppressing the interference from the outside.

At reference 616, the blobs are counted, and the center of each blob is identified from the map. Each center of the blob is a location that an indoor radio transmitter will be installed on the floor that maps to the floor plan image.

When it is determined that the size of the image is too big at reference 606, the flow goes to reference 628, where the floor plan is split into a plurality of sections. The floor plan image is then partitioned into the corresponding number of image sections. For each section, a radio propagation map is determined/predicted at reference 632. At reference 634, these radio propagation maps for different sections are then stitched/merged together, and the flow goes to reference 614, where the postprocessing is performed as discussed above.

Figure 7:
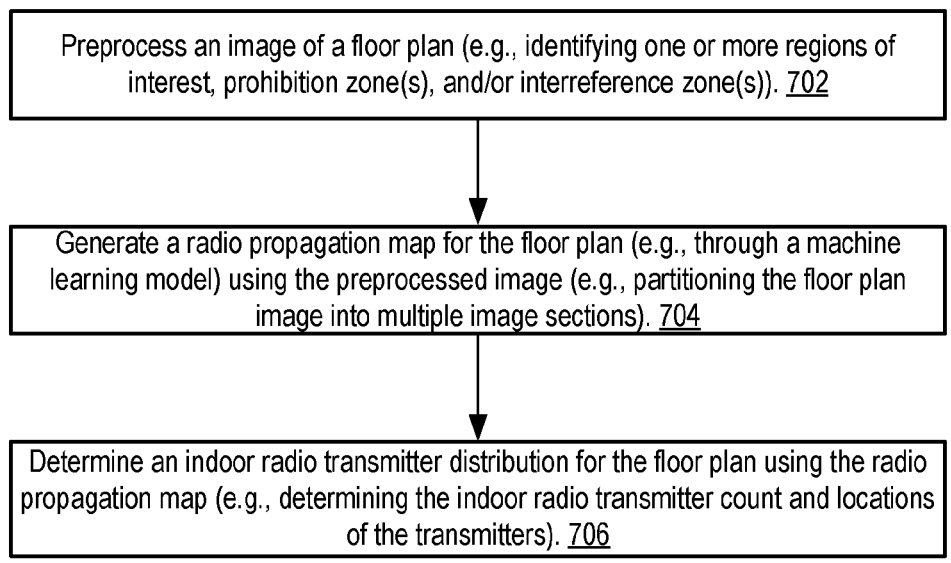
FIG. 7 is a second flow chart of determining an indoor radio transmitter distribution per some embodiments.

FIG. 7 is a second flow chart of determining an indoor radio transmitter distribution per some embodiments. The operations may be performed by an electronic device such as 902 discussed herein below. At reference 702, an image of a floor plan is preprocessed. For example, the preprocess may identify (1) one or more regions of interest that the indoor transmitters are to be placed, (2) prohibition zones, and/or (3) interference zones. The areas outside of the regions of interest may be masked out using masks as shown in FIG. 1B (the areas shown at reference 112). The regions of interest may exclude the one or more prohibition zones that no radio transmitters are allowed to be placed in some embodiments. In some embodiments, the regions of interest may exclude the one or more interference zones that are impacted by radio transmitters outside of the indoor cellular network.

In some embodiments, preprocessing the image of the floor plan comprises partitioning the image into a set of image sections.

At reference 704, a radio propagation map is generated for the floor plan using the preprocessed image. In some embodiments, a conditional Generative Adversarial Network (cGAN) is used to generate the radio propagation map as discussed herein above. The cGAN is trained using a plurality of data sets, each data set including one floor plan image and one radio propagation map produced for the one floor plan image. The radio propagation maps produced for the floor plan images in the data sets may be produced by human designers using industry standard indoor radio planning tools or from radio measurements collected from already deployed radio transmitters for various floor plans. Additionally, the radio propagation maps may be ones generated by the cGAN from other earlier floor plan images.

In some embodiments, the radio propagation map is generated through stitching sectional radio propagation patterns, each for an image section within the set of image sections.

At reference 706, an indoor radio transmitter distribution for the floor plan is determined using the radio propagation map. The indoor radio transmitter distribution includes a number of radio transmitters to be implemented in some embodiments. The indoor radio transmitter distribution includes locations of indoor radio transmitters on the floor plan.

Note that by preprocessing the floor plan image and identifying the one or more regions of interests, the machine learning model may be used more efficiently and produce more accurate radio propagation maps since the areas outside of the regions of interests tend to introduce noises in the machine learning.

Snapshots of an Embodiment

Figure 8:
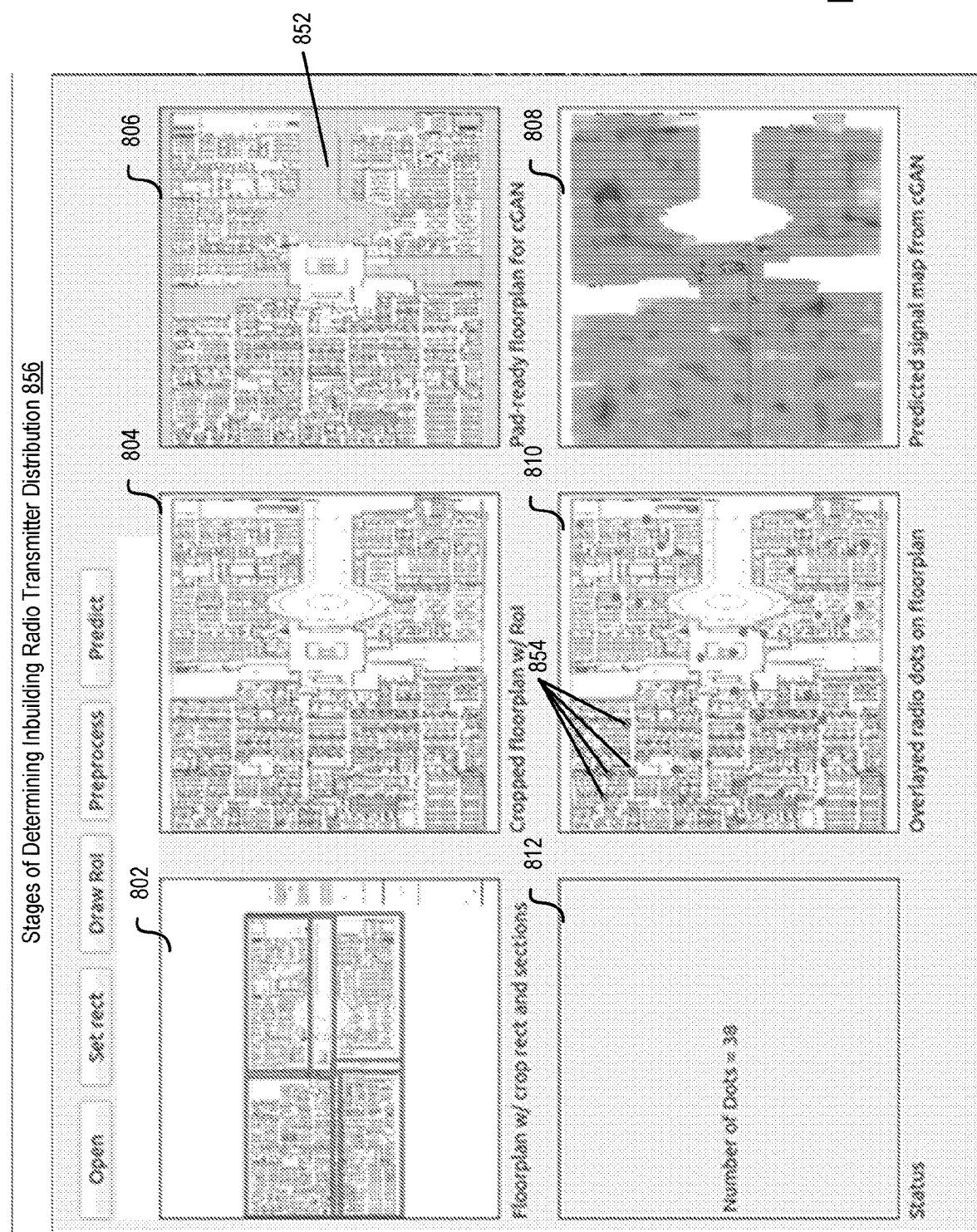
FIG. 8 shows snapshots of the process to determine an indoor radio transmitter distribution per one embodiment.

FIG. 8 shows snapshots of the process to determine an indoor radio transmitter distribution per one embodiment. Reference 802 shows a raw floor plan image provided to determine the indoor radio transmitter distribution on the floor plan. The floor plan image is partitioned into multiple sections as shown in rectangles. Reference 804 shows a section of the floor plan image that is a region of interest and that fits to the size that the electronic device can implement an embodiment and determine the indoor radio transmitter distribution.

Reference 806 shows the section of the floor plan image that is augmented by masking out the prohibition zones (the outer areas shown by reference 852). Reference 808 is the determined/predicted radio propagation map for the section of the floor plan image. Reference 810 shows the centers of blobs as solid dots (e.g., the ones shown by reference 854 at the top left of the image), which is the result of determining the indoor radio transmitter distribution, and the centers are the location of the indoor radio transmitters to be placed on the floor mapping to the floor plan image. Reference 812 shows the total number of dots, each for an indoor radio transmitter to be placed on the floor.

Using embodiments like this one, one may reduce lead time to produce preliminary estimates of the number of indoor radio transmitters, their placements, and associated bill of materials (BoMs) for a given venue or building. These embodiments may be used for different power transmission levels of the indoor radio transmitters, and different indoor radio transmitters may be placed at different locations at a given floor plan, based on the produced radio signal propagation map. The quick determination/estimation of an indoor radio transmitter distribution for a floor plan using a produced radio propagation map makes the network planning for an indoor radio network much more efficient and reliable, and enables the network designer to significantly scale up the design and deployment of indoor radio transmitters for its customers. The network engineers may implement an indoor radio network based on the indoor radio transmitter distribution. The embodiments thus are advantageous over the complex simulation tools.

Hardware Embodiments

Figure 9:
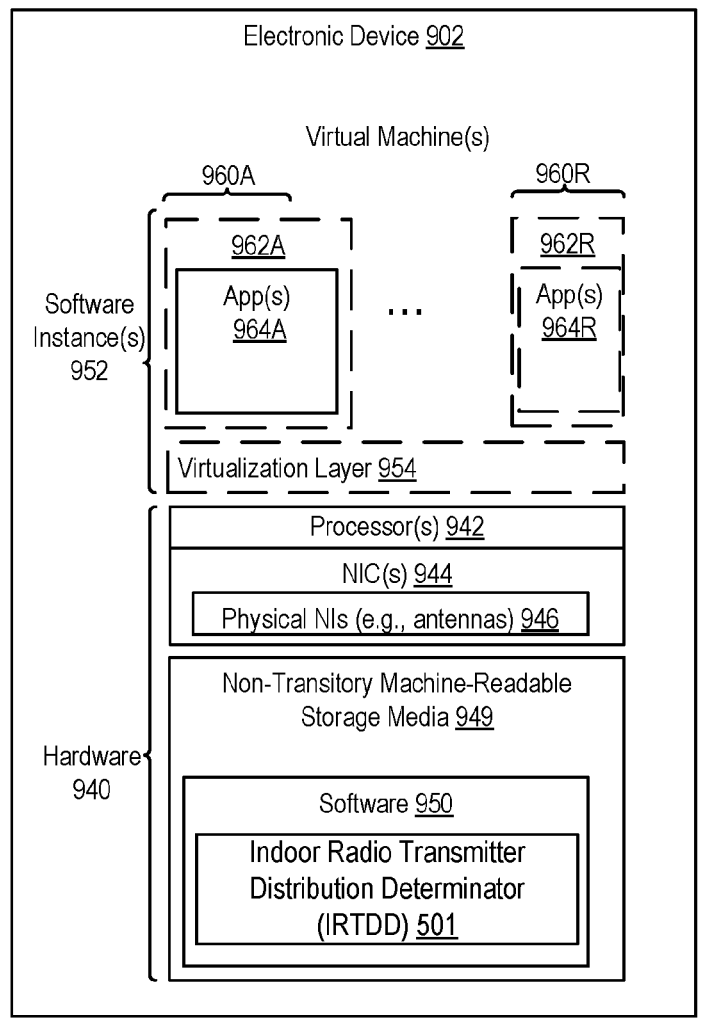
FIG. 9 illustrates an electronic device per one embodiment.

FIG. 9 illustrates an electronic device per one embodiment. The electronic device 902 may be implemented using custom application-specific integrated-circuits (ASICs) as processors and a special-purpose operating system (OS), or common off-the-shelf (COTS) processors and a standard OS.

The electronic device 902 includes hardware 940 comprising a set of one or more processors 942 (which are typically COTS processors or processor cores or ASICs) and physical NIs 946, as well as non-transitory machine-readable storage media 949 having stored therein software 950. During operation, the one or more processors 942 may execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R run on top of a guest operating system within an instance 962A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The software 950 contains the indoor radio transmitter distribution determinator (IRTDD) 501. The IRTDD 501 may perform operations in the one or more of exemplary methods described with reference to earlier figures. The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual electronic device 960A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 946 may include one or more antenna of the electronic device 902. An antenna port may or may not correspond to a physical antenna.

The electronic device 902 may be implemented in wireless networks discussed herein below as a network node or a separate control node (e.g., host computer 1410).

Terms

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other forms of propagated signals-such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment may be implemented using different combinations of software, firmware, and/or hardware.

A network node/device is an electronic device. Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Examples of network nodes also include NodeB, base station (BS), multi-standard radio (MSR) radio node (e.g., MSR BS, eNodeB, gNodeB, MeNB, SeNB), integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, RRU, RRH, nodes in distributed antenna system (DAS), core network node (e.g., MSC, MME, etc.), O&M, OSS, SON, positioning node (e.g., E-SMLC), etc.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notations should not be taken to mean that these are the only options or optional operations, and/or that blocks with solid borders are not optional in certain embodiments.

In the description, embodiments, and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

Figure 10:
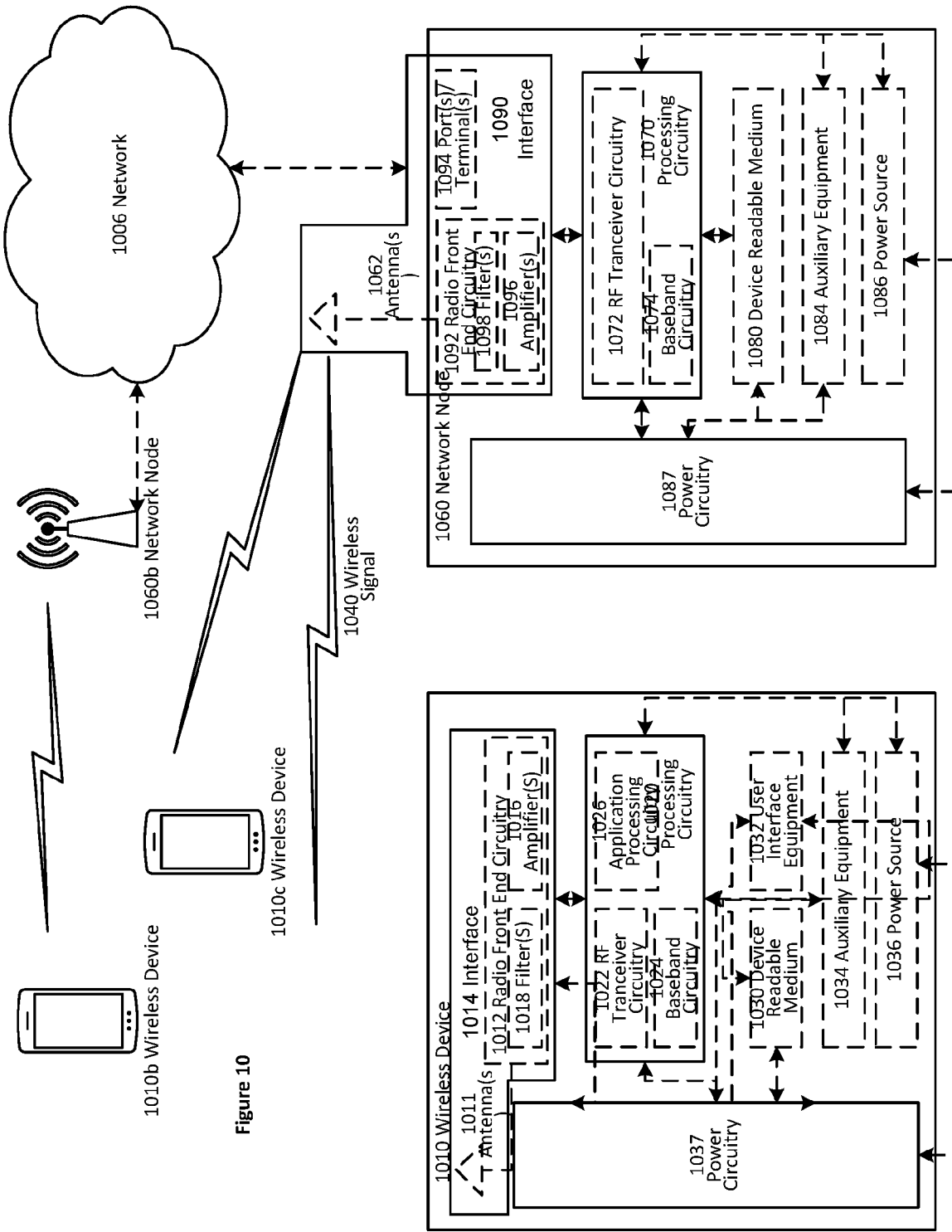
FIG. 10 shows a wireless network per some embodiments.

FIG. 10: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SoC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD), or a Digital Video Disk (DVD)), and/or any other volatile or non-volatile, non-transitory device readable, and/or computer-executable memory devices that store information, data, and/or instructions that may be used by processing circuitry 1070. Device readable medium 1080 may store any suitable instructions, data, or information, including a computer program, software, an application including one or more of logic, rules, code, tables, etc., and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092. Instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector, or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data, and/or signals may be received from a wireless device, another network node, and/or any other network equipment. Similarly, antenna 1062, interface 1090, and/or processing circuitry 1070 may be configured to perform any transmitting operations described herein as being performed by a network node. Any information, data, and/or signals may be transmitted to a wireless device, another network node, and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged, and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, home or personal appliances (e.g. refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036, and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data, and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments, processing circuitry 1020 of WD 1010 may comprise a SoC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc., and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD), or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
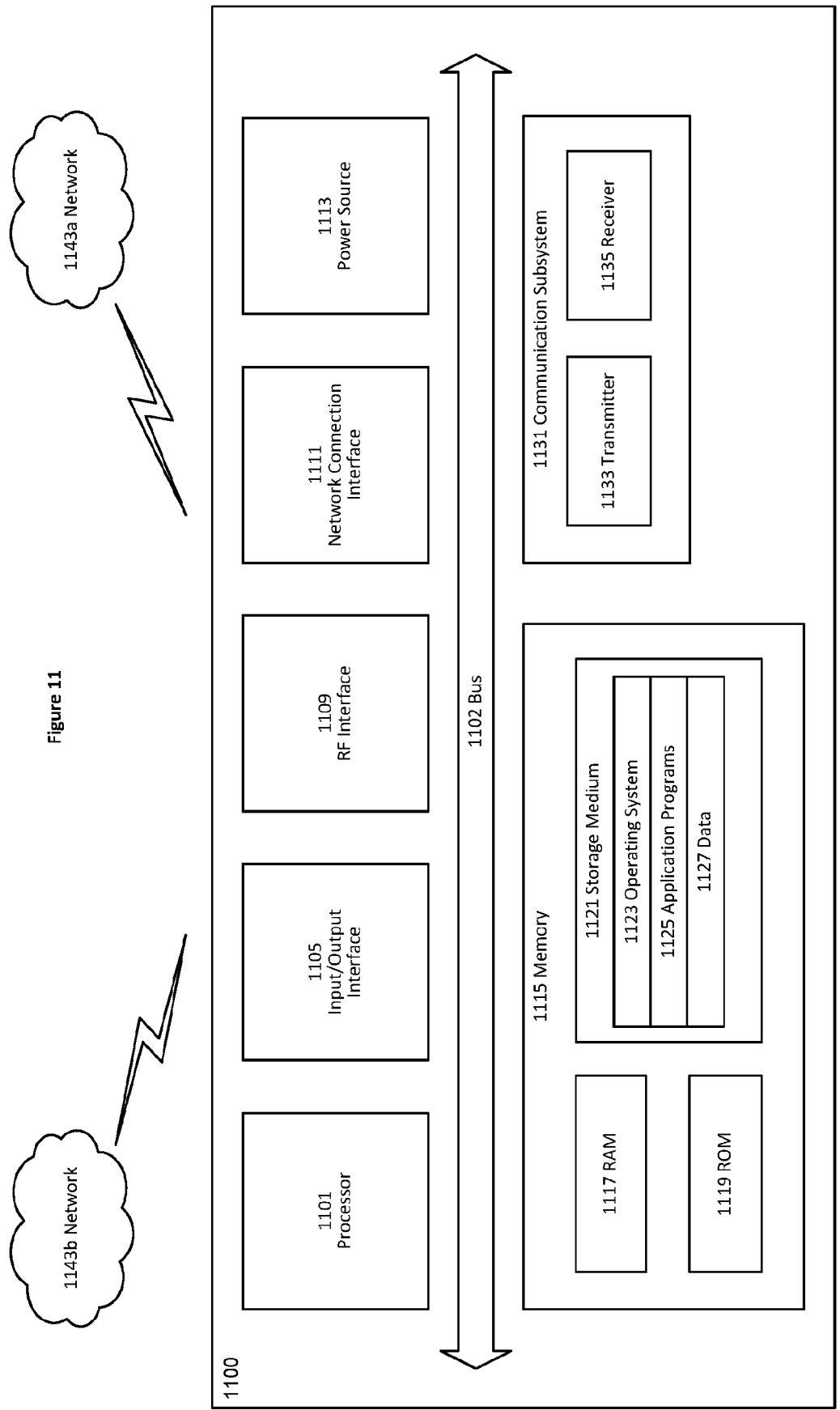
FIG. 11 shows a user equipment (UE) per some embodiments.

FIG. 11: User Equipment in Accordance with Some Embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
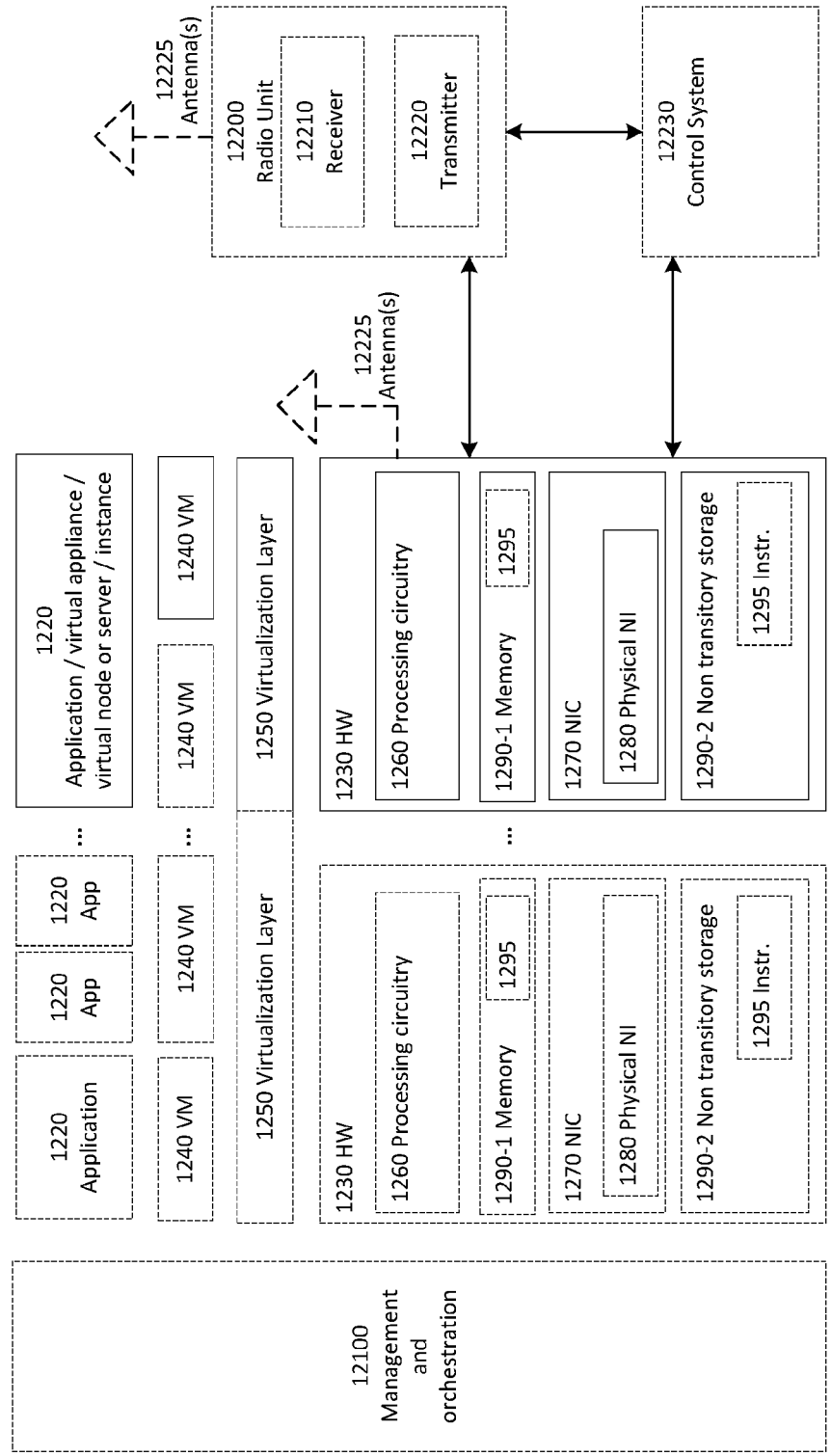
FIG. 12 is a schematic block diagram illustrating a virtualization environment in which functions implemented by some embodiments may be virtualized.

FIG. 12: Virtualization Environment in Accordance with Some Embodiments

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200 comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features, and/or benefits described in relation with some embodiments described herein.

Virtual machines 1240 comprise virtual processing, virtual memory, virtual networking or interface, and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
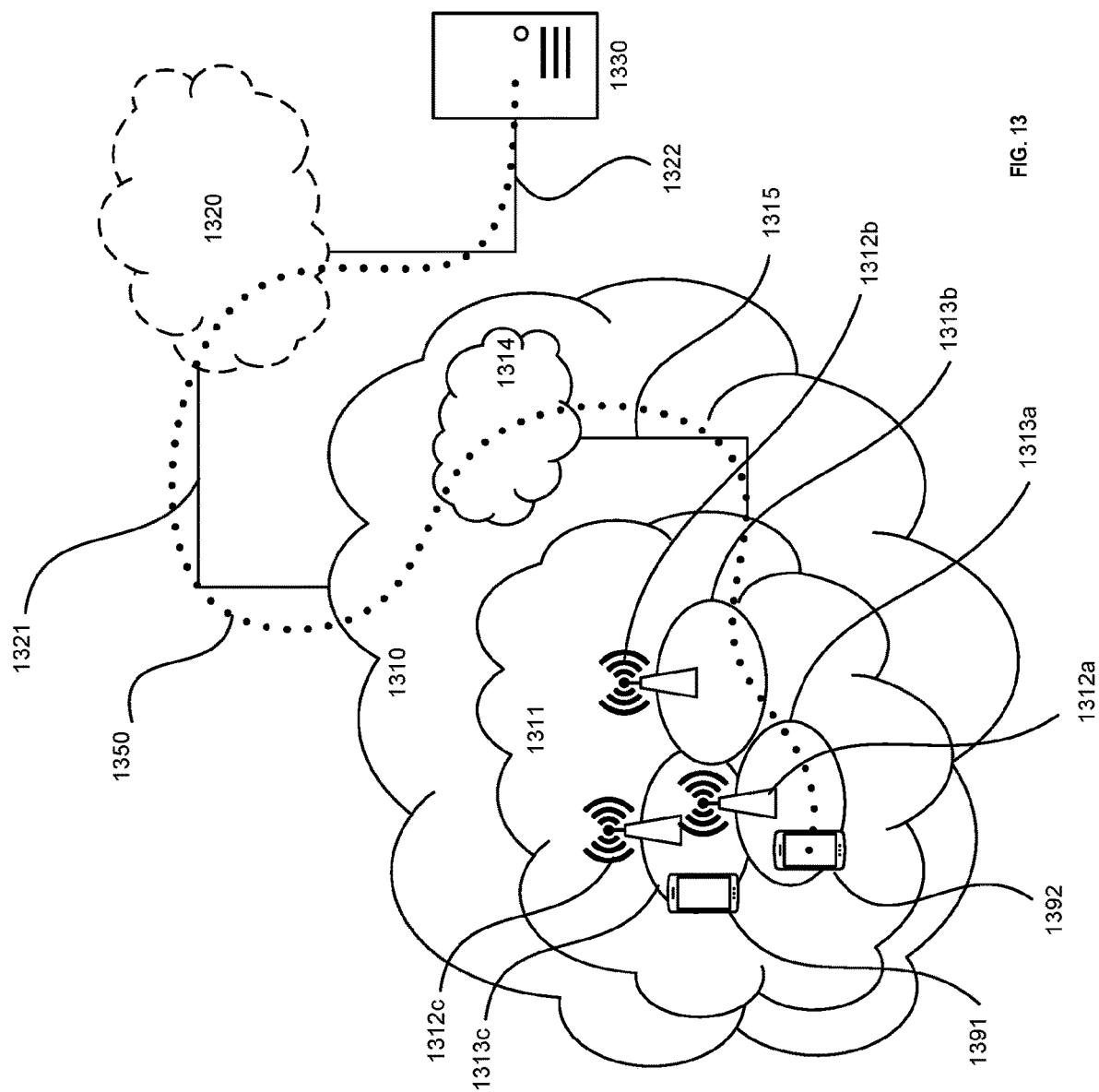
FIG. 13 is a telecommunication network connected via an intermediate network to a host computer per some embodiments.

FIG. 13: Telecommunication Network Connected Via an Intermediate Network to a Host Computer in Accordance with Some Embodiments With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
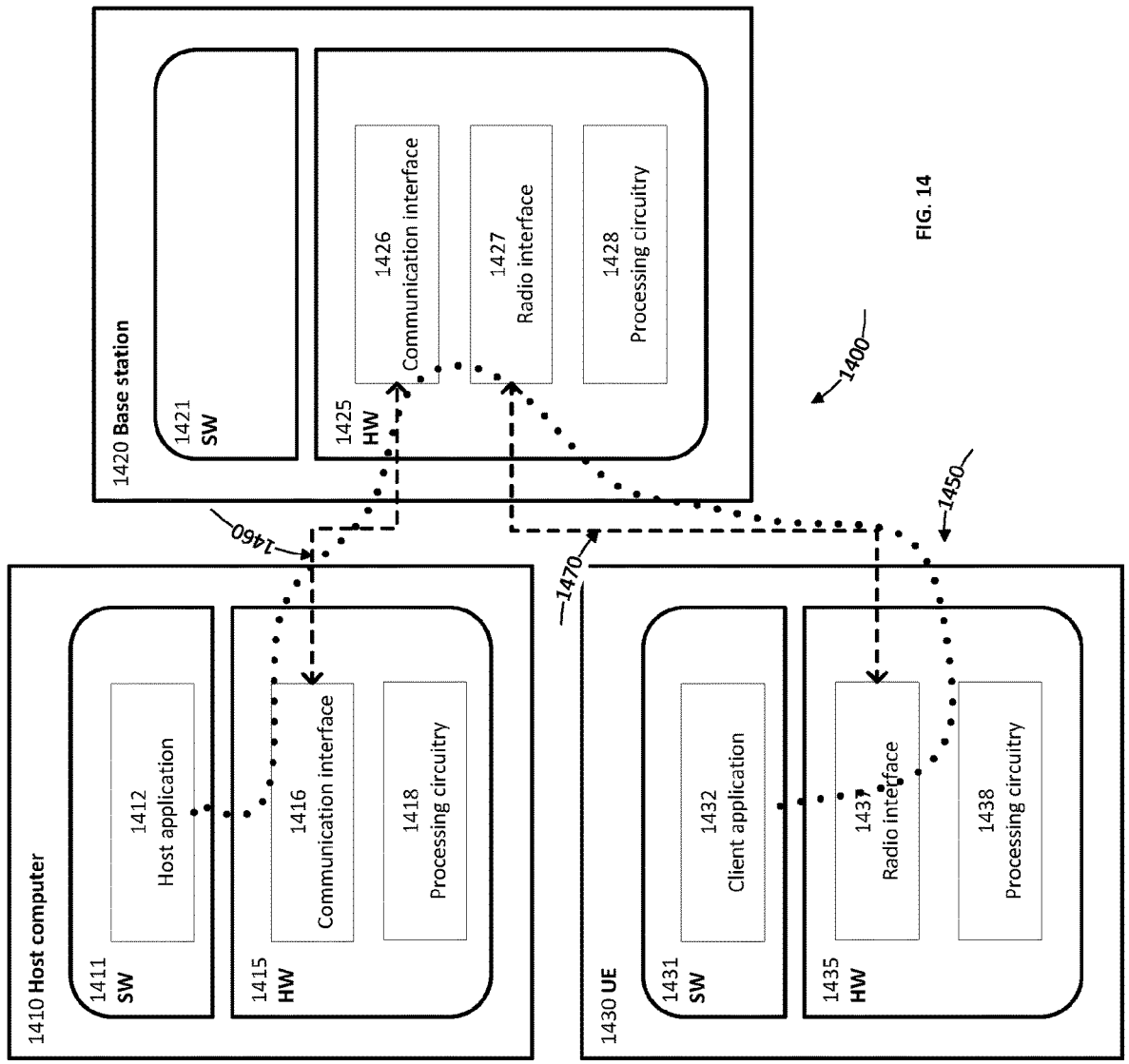
FIG. 14 shows a host computer communicating via a base station with a user equipment over a partially wireless connection per some embodiments.

FIG. 14: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420, and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency, and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency, and the like. The measurements may be implemented in that software 1411 and 1431 causes messages to be transmitted, in particular empty or 'dummy' messages, using OTT connection 1450 while it monitors propagation times, errors, etc.

Figure 15:
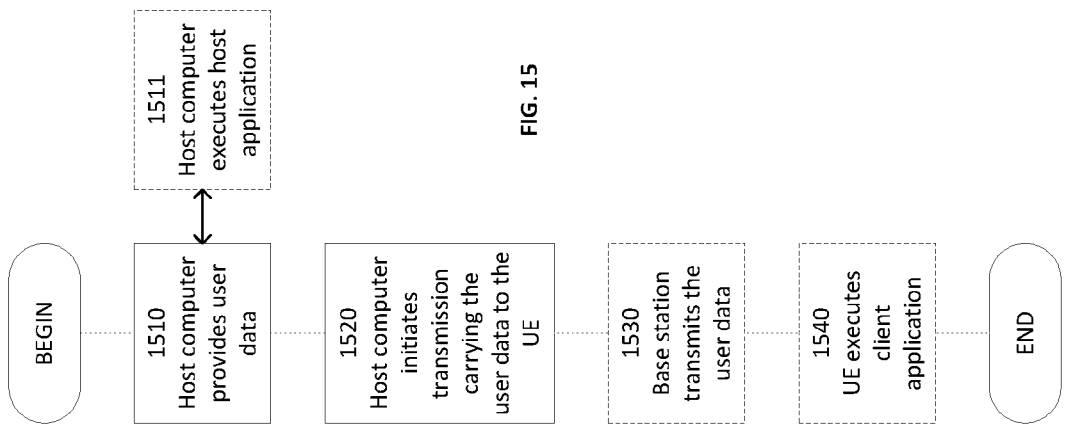
FIG. 15 is a flow diagram showing the operations implemented in a communication system including a host computer, a base station, and a user equipment per some embodiments.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1510, the host computer provides user data. In substep 1511 (which may be optional)

of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
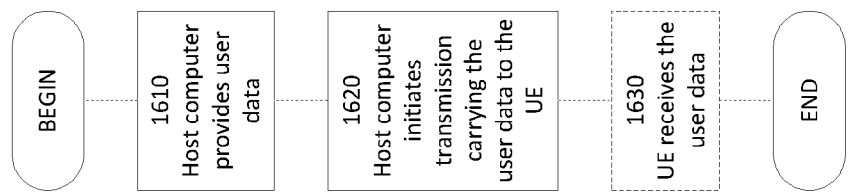
FIG. 16 is a flow diagram showing the operations implemented in a communication system including a host computer, a base station, and a user equipment per other embodiments.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
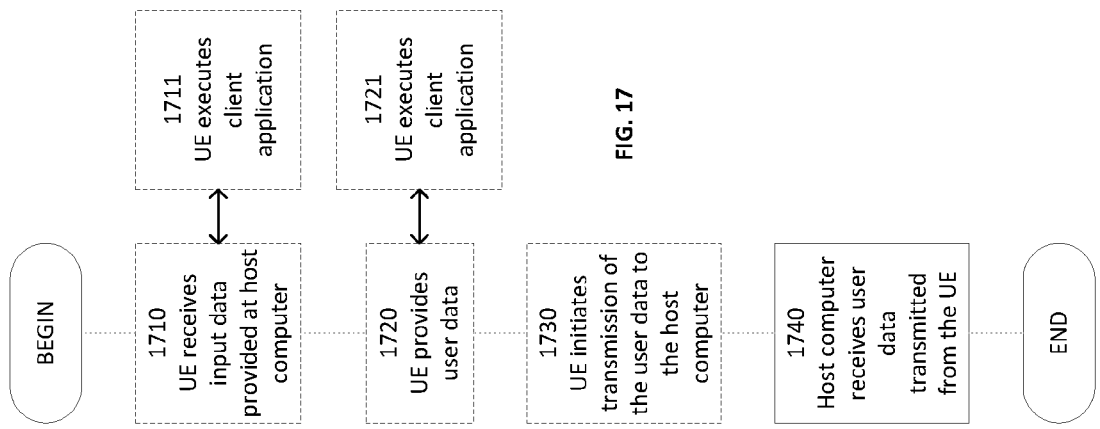
FIG. 17 is a flow diagram showing the operations implemented in a communication system including a host computer, a base station, and a user equipment per further embodiments.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
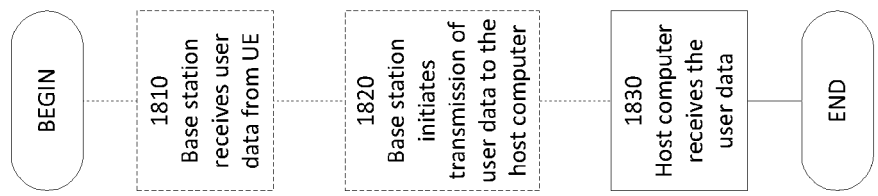
FIG. 18 is a flow diagram showing the operations implemented in a communication system including a host computer, a base station, and a user equipment per further embodiments.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state, and/or discrete devices, computer programs or instructions for carrying out respective tasks, procedures, computations, outputs, and/or displaying functions, and so on, as such as those that are described herein.

EMBODIMENTS

Group A Embodiments

1. A method for planning an indoor radio network for a building, the method comprising:
preprocessing (702) an image of a floor plan of the building;
generating (704) a radio propagation map for the floor plan using the preprocessed image; and
determining (706) an indoor radio transmitter distribution for the floor plan using the radio propagation map.
2. The method of embodiment 1, wherein preprocessing the floor plan comprises identifying one or more regions of interest using one or more masks.
3. The method of embodiment 1, wherein preprocessing the floor plan comprises identifying one or more prohibition zones that no radio transmitters are allowed to be placed.
4. The method of embodiment 1, wherein preprocessing the floor plan comprises identifying one or more interference zones that are impacted by radio transmitters outside of the indoor radio network.
5. The method of embodiment 1, wherein a conditional Generative Adversarial Network (cGAN) is used to generate the radio propagation map.
6. The method of embodiment 5, wherein the cGAN is trained using a plurality of data sets, each data set including one floor plan image and one radio propagation map produced for the one floor plan image.

7. The method of embodiment 1, wherein preprocessing the image of the floor plan comprises partitioning the image into a set of image sections.
8. The method of embodiment 7, wherein the radio propagation map is generated through stitching sectional radio propagation patterns, each for an image section within the set of image sections.
9. The method of embodiment 1, wherein the indoor radio transmitter distribution includes a number of radio transmitters to be implemented.
10. The method of embodiment 1, wherein the indoor radio transmitter distribution includes locations of indoor radio transmitters on the floor plan.

Group B Embodiments

11. An electronic device, comprising:
a processor and non-transitory machine-readable storage medium storing instructions, which when executed by the processor, are capable of causing the electronic device to perform any of the steps of any of the Group A embodiments.
12. A non-transitory machine-readable storage medium storing instructions, which when executed by a processor, are capable of causing the electronic device to perform any of the steps of any of the Group A embodiments.

What is claimed is:

1. A method for planning an indoor radio network for a building, the method comprising:
preprocessing an image of a floor plan of the building to generate a preprocessed image;
generating a radio propagation map for the floor plan using the preprocessed image based on a conditional Generative Adversarial Network (cGAN), wherein training the cGAN comprises using a gradient similarity loss function to measure a loss from a ground truth radio propagation map and a cGAN generated radio propagation map; and
determining an indoor radio transmitter distribution for the floor plan using the radio propagation map.

2. The method of claim 1, wherein the cGAN is trained using a plurality of data sets, a data set of the plurality of data sets including one floor plan image and one radio propagation map produced for the one floor plan image.

3. The method of claim 1, wherein the ground truth radio propagation map is generated from a human designed radio propagation map.

4. The method of claim 1, wherein gradient similarity loss functions in different scales for ground truth radio propagation maps and corresponding cGAN generated radio propagation maps are combined to measure a loss of the radio propagation map.

5. The method of claim 1, wherein preprocessing the floor plan comprises identifying one or more regions of interest using one or more masks.

6. The method of claim 1, wherein preprocessing the floor plan comprises identifying one or more prohibition zones that no radio transmitters are allowed to be placed.

7. The method of claim 1, wherein preprocessing the floor plan comprises identifying one or more interference zones that are impacted by radio transmitters outside of the indoor radio network.

8. The method of claim 1, wherein preprocessing the image of the floor plan comprises partitioning the image into a set of image sections.

9. The method of claim 8, wherein the radio propagation map is generated through stitching sectional radio propagation patterns, each for an image section within the set of image sections.

10. An electronic device, comprising:
a processor and non-transitory machine-readable storage medium storing instructions, which when executed by the processor, are capable of causing the electronic device perform:
preprocessing an image of a floor plan of a building to generate a preprocessed image;
generating a radio propagation map for the floor plan using the preprocessed image based on a conditional Generative Adversarial Network (cGAN), wherein training the cGAN comprises using a gradient similarity loss function to measure a loss from a ground truth radio propagation map and a cGAN generated radio propagation map; and
determining an indoor radio transmitter distribution for the floor plan using the radio propagation map.

11. The electronic device of claim 10, wherein the ground truth radio propagation map is generated from a human designed radio propagation map.

12. The electronic device of claim 10, wherein preprocessing the floor plan comprises identifying one or more regions of interest using one or more masks.

13. The electronic device of claim 10, wherein preprocessing the floor plan comprises identifying one or more prohibition zones that no radio transmitters are allowed to be placed.

14. A non-transitory computer-readable storage medium that provides instructions that, when executed by a processor of an electronic device, cause the electronic device to perform:
preprocessing an image of a floor plan of a building to generate a preprocessed image;
generating a radio propagation map for the floor plan using the preprocessed image based on a conditional Generative Adversarial Network (cGAN), wherein training the cGAN comprises using a gradient similarity loss function to measure a loss from a ground truth radio propagation map and a cGAN generated radio propagation map; and
determining an indoor radio transmitter distribution for the floor plan using the radio propagation map.

15. The non-transitory computer-readable storage medium of claim 14, wherein the ground truth radio propagation map is generated from a human designed radio propagation map.

16. The non-transitory computer-readable storage medium of claim 14, wherein gradient similarity loss functions in different scales for the ground truth radio propagation maps and corresponding cGAN generated radio propagation maps are combined to measure a loss of the radio propagation map.

17. The non-transitory computer-readable storage medium of claim 14, wherein preprocessing the image of the floor plan comprises partitioning the image into a set of image sections.

* * * * *